US007624418B2

(12) United States Patent
Lee et al.

(10) Patent No.: US 7,624,418 B2

(45) Date of Patent: Nov. 24, 2009

(54) APPARATUS AND METHOD FOR RECEIVING BROADCASTING DATA IN DIGITAL VIDEO BROADCASTING RECEIVER

(75) Inventors: Jae-Hong Lee, Seoul (KR); Jung-Wook Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 359 days.

(21) Appl. No.: 11/656,275

(22) Filed: Jan. 22, 2007

(65) Prior Publication Data

US 2007/0189393 A1 Aug. 16, 2007

(30) Foreign Application Priority Data

Jan. 20, 2006 (KR) ...................... 10-2006-0006503

(51) Int. Cl.
*H04N 7/173* (2006.01)

(52) U.S. Cl. ................... 725/116; 370/395.42; 370/442

(58) Field of Classification Search ................. 725/135, 725/116; 370/395.42, 442
See application file for complete search history.

(56) References Cited

U.S. PATENT DOCUMENTS 6,792,601 B1 * 9/2004 Dimpsey et al. ............ 718/102
2007/0002870 A1 * 1/2007 Pekonen et al. ........ 370/395.42
2007/0277077 A1 * 11/2007 Vesma et al. ................ 714/755
2008/0276287 A1 * 11/2008 Mizuta ........................ 725/62

FOREIGN PATENT DOCUMENTS

| | | |
|---|---|---|
| GB | 2406483 | 3/2005 |
| KR | 1020060099724 | 9/2006 |
| WO | WO 2004/102964 | 11/2004 |
| WO | WO 2004/107619 | 12/2004 |
| WO | WO 2006/030329 | 3/2006 |

* cited by examiner

*Primary Examiner*—Brian T Pendleton
*Assistant Examiner*—Cai Chen
(74) *Attorney, Agent, or Firm*—The Farrell Law Firm, LLP

(57) ABSTRACT

Disclosed is an apparatus and method for receiving broadcasting data in a digital video broadcasting receiver using Digital Video Broadcasting-Handhelds (DVB-H), the method including detecting section headers carrying broadcasting service information from a received Transport Stream (TS) packet and extracting delta-t information from the section headers, counting the number of extracted delta-t information, comparing the counted number of delta-t information with a predetermined delta-t lock number, and when the counted number is less than the delta-t lock number, counting the start time of a next burst duration based on the delta-t information.

11 Claims, 11 Drawing Sheets

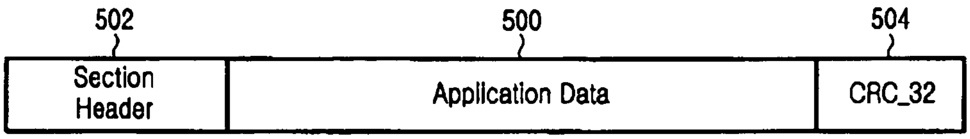

| Syntax | Number of bits | Mnemonic |
|---|---|---|
| datagram_section () { | | |
| table_id | 8 | uimsbf |
| section_syntax_indicator | 1 | bslbf |
| private_indicator | 1 | bslbf |
| reserved | 2 | bslbf |
| section_length | 12 | uimsbf |
| MAC_address_6 | 8 | uimsbf |
| MAC_address_5 | 8 | uimsbf |
| reserved | 2 | bslbf |
| payload_scambling_control | 2 | bslbf |
| address_scrambling_control | 2 | bslbf |
| LLC_SNAP_flag | 1 | bslbf |
| current_next_indicator | 1 | bslbf |
| section_number | 8 | uimsbf |
| last_section_number | 8 | uimsbf |
| MAC_address_4 | 8 | uimsbf |
| MAC_address_3 | 8 | uimsbf |
| MAC_address_2 | 8 | uimsbf |
| MAC_address_1 | 8 | uimsbf |
| if (LLC_SNAP_flag == '1') { | | |
| LLC_SNAP () | | |
| }else { | | |
| for (j=0; j<N1; j++) { | | |
| IP_datagram_data_byte | 8 | bslbf |
| } | | |
| } | | |
| if (section_number == last _section_number) { | | |
| for (j=0; j<N2; j++) { | | |
| stuffing_byte | 8 | bslbf |
| } | | |
| } | | |
| if (section_syntax_indicator == '0') { | | |
| checksum | 32 | uimsbf |
| } else { | | |
| CRC_32 | 32 | rpchof |
| } | | |
| } | | |

502 (table_id through MAC_address_1); 510 (MAC_address_4 through MAC_address_1); 500 (if (LLC_SNAP_flag …) through stuffing loop); 504 (checksum / CRC_32); 508 0x3e (table_id through reserved); 506

FIG.5
(PRIOR ART)

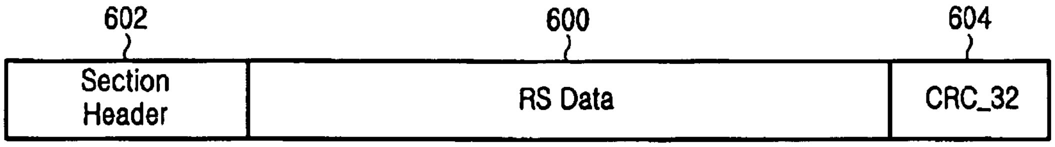

| | Syntax | Number of bits | Identifier | |
|---|---|---|---|---|
| | MPE-FEC_section() { | | | |
| | table_id | 8 | uimsbf | 608 |
| | section_syntax_indicator | 1 | bslbf | 0x78 |
| | private_indicator | 1 | bslbf | |
| | reserved | 2 | bslbf | |
| 602 | section_length | 12 | uimsbf | |
| | padding_columns | 8 | uimsbf | |
| | reserved_for_future_use | 8 | bslbf | |
| | reserved | 2 | bslbf | |
| | reserved_for_future_use | 5 | bslbf | |
| | current_next_indicator | 1 | bslbf | |
| | section_number | 8 | uimsbf | |
| | last_section_number | 8 | uimsbf | |
| 610 | real_time_parameters() | | | |
| | for (i=0; i<N; i++) { | | | |
| 600 | rs_data_byte | 8 | uimsbf | |
| | } | | | |
| 604 | CRC_32 | 32 | uimsbf | |
| | } | | | |

606

FIG.6
(PRIOR ART)

| Syntax | Number of bits | Identifier |
| --- | --- | --- |
| real_time_parameters () { | | |
| delta_t (700) | 12 | uimsbf |
| table_boundary (702) | 1 | bslbf |
| frame_boundary (704) | 1 | bslbf |
| address | 18 | uimsbf |
| } | | |

FIG.7
(PRIOR ART)

APPARATUS AND METHOD FOR RECEIVING BROADCASTING DATA IN DIGITAL VIDEO BROADCASTING RECEIVER

PRIORITY

This application claims the benefit under 35 U.S.C. § 119 (a) of a Korean Patent Application filed in the Korean Intellectual Property Office on Jan. 20, 2006 and assigned Serial No. 2006-6503, the entire disclosure of which is incorporated herein by reference.

BACKGROUND OF THE INVENTION

1. Field of the Invention

The present invention relates to an apparatus and method for receiving a digital broadcasting service, and, in particular, to an apparatus and method for receiving broadcasting data in a digital video broadcasting receiver using the Digital Video Broadcasting-Handhelds (DVB-H) standard.

2. Description of the Related Art

Generally, broadcasting services are provided to all users with terminals. These broadcasting services are classified into an audio broadcasting service such as radio broadcasting service for providing only audio, a video broadcasting service such as television for providing audio and video services, and a multimedia broadcasting service including audio, video, and data services. The broadcasting services are based on an analog system, and are currently evolving into digital broadcasting with the rapid development of various technologies. Moreover, the broadcasting services are being developed in various systems such as a multimedia service system of a wired network for providing data of high image quality at high rates by wire, a system for providing a multimedia service using an artificial satellite, and a system that simultaneously uses a wire and an artificial satellite, without use of a system for providing a service on the basis of a transmission tower conventionally managed by a broadcasting station.

Recently, a Digital Multimedia Broadcasting (DMB) system, as one of the above-described systems, is being actively commercialized. This DMB system has been derived from Digital Audio Broadcasting (DAB) and is based on European Research Coordination Agency (Eureka) Project-147, serving as the technical standard of DAB in Europe.

In Europe, as the origin of the DAB technology, a group called Digital Video Broadcasting (DVB) has been organized for multimedia broadcasting services and is working to establish a separate standard for portable broadcasting services, called Digital Video Broadcasting-Handhelds (DVB-H). DVB-H is a new broadcasting standard under development by Digital Audio Broadcasting (DAB) that is a European Group for digital TV broadcasting standardization, following satellite digital TV (DVB-S), digital cable TV (DVB-C), and terrestrial digital TV (DVB-T).

The determination that voluminous multimedia contents such as movies or broadcast dramas cannot be implemented through portable terminals in accordance with $3^{rd}$ mobile communication (Universal Mobile Telecommunication System (UMTS) or International Mobile Telecommunications-2000 (IMTS-2000)), terrestrial digital TV, and DAB, the DVB group has promoted standardization named ‘DVB-extension (DVB-X)’, which was later renamed DVB-H to clearly indicate ‘portable broadcasting’.

DVB-H is designed to reinforce mobility in the European digital TV transmission standard DVB-T and is an extension of DVB-T considering low power, mobility, and portability of mobile terminals or portable video devices. Thus, most physical layer standards of DVB-H comply with those of DVB-T and several functions for portable/mobile reception are added thereto.

DVB-H systems support additional Error Correction Coding (ECC) for layer-3 Internet Protocol (IP) packets. This additional ECC process is called Multi Protocol Encapsulation—Forward Error Correction (MPE-FEC).

In DVB-H systems, broadcasting data is composed of IP datagrams and an MPE-FEC frame is formed by performing Reed-Solomon (R-S) coding on the IP datagram. Thus, the MPE-FEC frame is composed of an MPE section carrying the IP datagram and an MPE-FEC section carrying parity data resulting from the R-S encoding. The MPE section and the MPE-FEC section are transmitted through a payload of a Transport Stream (TS) packet, which is a transport unit of the DVB-H system, over a physical layer.

FIG. 1 illustrates the data structure of a TS packet in a general DVB-H system. Referring to FIG. 1, reference numeral 100 indicates an IP datagram that carries broadcasting data or application data. The datagram means a packet including the address of a network termination point to which data is destined. Reference numeral 102 indicates an MPE section carrying the IP datagram 100 or an MPE-FEC section carrying parity data of the IP datagrams 100. Reference numeral 104 indicates a TS packet carrying the MPE section or MPE-FEC section 102. A single TS packet 104 may include a plurality of MPE sections or MPE-FEC sections 102 or a single MPE section or MPE-FEC section 102 may be transmitted through a plurality of TS packets 104.

FIG. 2 explains R-S encoding performed by a transmitter of a general DVB-H system. The transmitter generally performs a single R-S encoding operation in each of a physical layer and a link layer. Referring to FIG. 2, reference numeral 200 indicates a column of an MPE-FEC frame and reference numeral 202 indicates a row of the MPE-FEC frame. The column 200 is composed of 255 bytes, in which a left region of 191 bytes is an application data table region 204 for the MPE section including the IP datagram 100 and a right region of 64 bytes is an R-S data table region 206 for R-S data or parity data resulting from R-S encoding with respect to broadcasting data stored in the application data table region 204. In contrast, the row 202 is variable up to 1024 rows.

As illustrated in FIG. 2, N IP datagrams 100 are stored in the application data table region 204 along the vertical direction. If the application data table region 204 is not filled with the first through $N^{th}$ IP datagrams, the application data table region 204 is entirely filled up by filling up the remaining space with zeros, i.e., performing zero padding on the remaining space, as indicated by numeral 208. Once the application data table region 204 is entirely filled with the IP datagrams or by performing the zero padding, R-S encoding is performed in the horizontal direction and parity data resulting from the R-S encoding is filled in an R-S data table region 206, as illustrated in FIG. 2.

By performing R-S encoding with respect to IP datagrams through the MPE-FEC process described with reference to FIGS. 1 and 2, an MPE-FEC frame is formed. Data of the MPE-FEC frame is reconfigured as a transport unit called a section, and the IP datagram 100 is reconfigured as an MPE section with the addition of a section header and Cyclic Redundancy Check (CRC) 32 bits. Parity data resulting from R-S encoding is also reconfigured as an MPE-FEC section with the addition of a section header and CRC 32 bits. The section header includes information required for MPE-FEC processing and time slicing and is positioned in front of a section. The CRC 32 bits are positioned at the rear of a section. These sections are transmitted through a payload of the TS packet 104 over a physical layer.

FIG. 3 explains time slicing for transmission of a TS packet in a transmitter of a general DVB-H system. A general transmitter generally transmits data with a fixed bandwidth as shown by numeral 306, but a transmitter of a DVB-H system transmits a burst of predetermined data as in burst size 310.

The DVB-H system supports time slicing to reduce power consumption of a receiver. Time slicing means data transmission in bursts. In other words, data to be transmitted during the entire time duration 300 is transmitted only during a burst duration 302 by increasing a data rate. Thus, the entire time duration 300 can be divided into the burst duration 302 during which data transmission occurs and an off-time duration 304 during which no data transmission occurs.

In FIG. 3, reference numeral 306 indicates an average bandwidth for general stream transmission without time slicing and reference numeral 308 indicates a burst bandwidth for transmission of the transmitter in the DVB-H system. The entire time duration 300 lasts from the start of current burst transmission until the start of next burst transmission and is divided into the burst duration 302 during which data transmission occurs and the off-time duration 304 during which no data transmission occurs. The burst duration 302 indicates the start and end intervals of burst transmission and the off-time duration 304 during which any transport packet is not transmitted exists between burst durations. A single MPE-FEC frame can be transmitted per burst size 310.

Transmission of an MPE-FEC frame will now be described with reference to FIG. 4. FIG. 4 is a block diagram of a transmitter in a general DVB-H system. The DVB-H system illustrated in FIG. 4 broadcasts IP data as broadcasting data to a plurality of users, together with R-S parity data for error correction of the broadcasting data.

In FIG. 4, an MPE-FEC encoder 401 generates MPE sections including IP datagrams as broadcasting data for section-based transmission of the IP datagrams and generates MPE-FEC sections including parity data for Forward Error Correction (FEC) of the MPE sections. The parity data is generated by a well-known external encoding technique, R-S encoding. The output of the MPE-FEC encoder 401 is delivered to a time slicing processor 403 to undergo time slicing processing for transmission of the broadcasting data in burst. As mentioned above, a single MPE-FEC frame is transmitted during a single burst duration. The IP datagram that undergoes the time slicing processing may be converted into a serial/parallel signal according to a modulation order and a hierarchical or non-hierarchical transmission mode after High Priority (HP) stream processing.

In FIG. 4, a bit interleaver 405 and a symbol interleaver 407 perform bit-based interleaving and symbol-based interleaving to disperse a transmission error, respectively. The interleaved signal is symbol-mapped by a symbol mapper 409 according to a predetermined modulation scheme such as Quadrature Phase Shift Keying (QPSK), 16 Quadrature Amplitude Modulation (QAM), or 64 QAM and is then delivered to an Inverse Fast Fourier Transform (IFFT) unit 411. The IFFT unit 411 transforms a frequency-domain signal into a time-domain signal. A guard interval insertion unit (not shown) inserts a guard interval into the IFFT transformed signal, thereby generating a base-band Orthogonal Frequency Division Multiplexing (OFDM) symbol. The OFDM symbol is pulse-shaped by a digital base-band filter and undergoes modulation in a Radio Frequency (RF) modulator 413, and is finally transmitted as a TS packet that is a DVB-H signal via an antenna 415.

FIG. 5 illustrates the structure and field format of an MPE section generated by a transmitter of a general DVB-H system. As described with reference to FIGS. 1 and 2, an IP datagram carrying application data 500 is extracted along the vertical direction from the application data table region 204 of the MPE-FEC frame and a section header 502 and CRC 32 bits 504 are added to the application data 500, thereby reconfiguring the application data 500 as an MPE section. Reference numeral 506 indicates the message format of the MPE section including the section header 502, the application data 500 as broadcasting data, and the CRC 32 bits 504. A receiver can recognize that received data is an MPE section by detecting '0x3e ' indicated by reference numeral 508.

Reference numeral 510 indicates a real time parameter and contains frame boundary information indicating a point of time for transmitting the IP datagram to an upper layer when the transmitter transmits an MPE section that does not undergo R-S encoding or recognizes that the receiver normally receives the MPE-FEC frame through CRC checking. The real time parameter 510 is described in detail with reference to FIG. 6.

FIG. 6 illustrates the structure and field format of an MPE-FEC section generated by a transmitter of a general DVB-H system. Parity data (or R-S data) 600 generated through R-S encoding with respect to the MPE section is also reconfigured as an MPE-FEC section 606 with the addition of a section header 602 and CRC 32 bits 604. As discussed above, the header section 602 contains information required for MPE-FEC decoding and time slicing and is positioned in front of a section. The CRC 32 bits 604 are positioned at the rear of a section. These sections are transmitted through a payload of the TS packet 104 over a physical layer.

Reference numeral 606 indicates the message format of the MPE-FEC section including the section header 602, the R-S data 600, and the CRC 32 bits 604. The receiver can recognize that received data is an MPE-FEC section by detecting '0x78' indicated by 608. Reference numeral 610 indicates a real time parameter that will be described in detail with reference FIG. 7.

FIG. 7 illustrates the message format of the real time parameter 510 illustrated in FIG. 5 or the real time parameter 610 illustrated in FIG. 6. Delta_t information 700 indicates a point of time at which transmission of a next MPE-FEC frame starts, i.e., a burst duration, starts. Table_boundary information 702 indicates whether an MPE section generated in a transmitter of a DVB-H system is the last MPE section in an application data table region. When the table_boundary information 702 is set to "1", it means that a currently transmitted MPE section is the last MPE section of the application data table region in the MPE-FEC frame.

Frame_boundary information 704 indicates whether an MPE-FEC section generated in the transmitter of the DVB-H system is the last MPE-FEC section in the MPE-FEC frame. When the frame_boundary information 704 is set to "1", it means that a currently transmitted MPE-FEC section is the last MPE-FEC section in the MPE-FEC frame.

FIG. 8 illustrates the physical meaning of the delta-t information 700 included in the real time parameter 600. As described above, the transmitter of the DVB-H system transmits the MPE-FEC frame only during the burst duration 302 using time slicing. Every MPE or MPE-FEC section included in the MPE-FEC frame includes delta-t information 804 in a section header and the delta-t information 804 varies with a section. Thus, a receiver of the DVB_H system stops data reception during the off-time duration 304 to reduce power consumption and resumes the data reception at a next burst start point using the delta_t information 804. To this end, the receiver predicts the next burst start point to resume the data reception by counting during a time interval indicated by the delta-t information 804.

However, if the delta-t information 804 is incorrectly calculated or improperly received due to an error introduced during transmission, the data reception will resume at a wrong point of time, causing a failure to receive desired burst data and thus degrading reception performance.

SUMMARY OF THE INVENTION

An object of the present invention is to address at least the above problems and/or disadvantages and to provide at least the advantages described below. Accordingly, an object of the present invention is to provide an apparatus and method for accurately receiving data according to time slicing in a receiver of a DVB-H system.

Another object of the present invention is to provide an apparatus and method for accurately predicting a burst duration during which data is to be transmitted from a transmitter, based on delta-t information transmitted from the transmitter in a receiver of a DVB-H system.

According to one object of the present invention, there is provided a method for receiving broadcasting data in a receiver of a digital broadcasting system supporting time slicing. The method includes detecting section headers carrying broadcasting service information from a received Transport Stream (TS) packet and extracting delta-t information from the section headers, counting the number of extracted delta-t information, comparing the counted number of delta-t information with a predetermined delta-t lock number, and when the counted number is less than the delta-t lock number, counting the start time of a next burst duration based on the delta-t information.

According to another object of the present invention, there is provided an apparatus for receiving broadcasting data in a receiver of a digital broadcasting system supporting time slicing. The apparatus includes a section header extractor for detecting section headers carrying broadcasting service information from a received Transport Stream (TS) packet and extracting delta-t information from the section headers and a time slicing processor for counting the number of extracted delta-t information, comparing the counted number of delta-t information with a predetermined delta-t lock number, counting the start time of a next burst duration based on the delta-t information when the counted number is less than the delta-t lock number, and resuming data reception when completing counting the time indicated by the delta-t information.

According to another object of the present invention, there is provided a method for receiving broadcasting data in a receiver of a digital broadcasting system supporting time slicing. The method includes detecting section headers carrying broadcasting service information from a received Transport Stream (TS) packet and extracting delta-t information from the section headers, counting the start time of a next burst duration based on the delta-t information, when a difference between first delta-t information included in a newly received section and the current delta-t counter value counting the start time of the next burst duration using second delta-t information included in a previously received section does not exceed the predetermined maximum difference limit, updating the current delta-t counter value counting the start time of the next burst duration using the newly received first delta-t information and counting the start time of the next burst duration using the updated delta-t counter value, and receiving a next burst at the start time of the next burst duration.

BRIEF DESCRIPTION OF THE DRAWINGS

The above and other features and advantages of the present invention will be more apparent from the following detailed description taken in conjunction with the accompanying drawings, in which:

FIG. 5 illustrates the structure and field format of a Multi Protocol Encapsulation (MPE) section generated by a transmitter of a general DVB-H system;

FIG. 6 illustrates the structure and field format of a Multi Protocol Encapsulation—Forward Error Correction (MPE-FEC) section generated by a transmitter of a general DVB-H system;

FIG. 7 illustrates the message format of a real time parameter illustrated in FIGS. 5 or 6;

DETAILED DESCRIPTION OF THE PREFERRED EMBODIMENTS

A detailed construction is provided with reference to the accompanying drawings to assist in a comprehensive understanding of preferred embodiments of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

Figure 9:
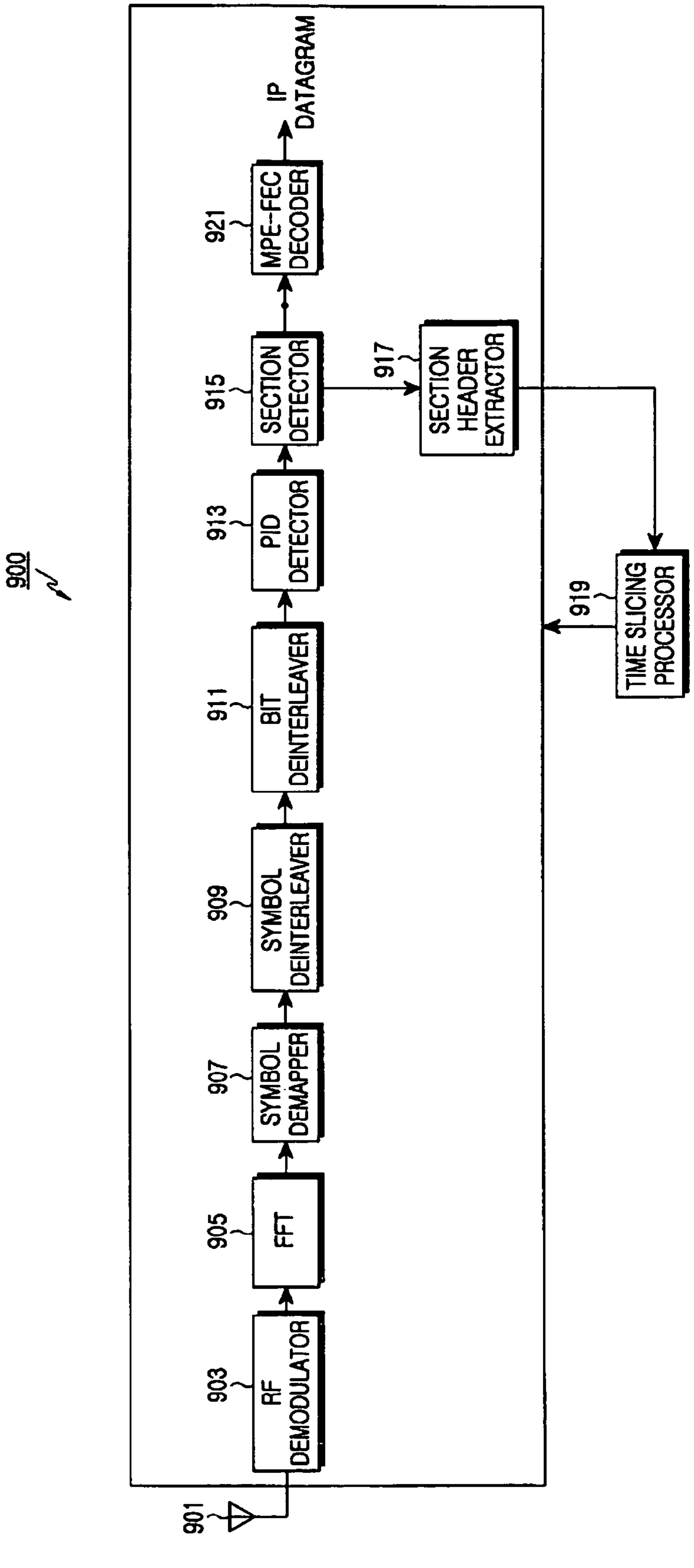
FIG. 9 is a block diagram of a receiver in a DVB-H system according to the present invention.

FIG. 9 is a block diagram of a receiver 900 in a Digital Video Broadcasting-Handhelds (DVB-H) system according to the present invention. Referring to FIG. 9, a Transport Stream (TS) packet received from a wireless network is received by a Radio Frequency (RF) demodulator 903 through an antenna 901. Orthogonal Frequency Division Multiplexing (OFDM) symbols of the TS packet, which have been down-converted and transformed to a digital signal by the RF demodulator 903, are transformed to a frequency-domain signal by a Fast Fourier Transform (FFT) unit 905. A symbol demapper 907 performs symbol demapping on a received signal according to a predetermined modulation scheme such as Quadrature Phase Shift Keying (QPSK), 16 Quadrature Amplitude Modulation (QAM), or 64 QAM. A symbol deinterleaver 909 and a bit deinterleaver 911 perform symbol-based deinterleaving and bit-based deinterleaving to reconstruct the original signal.

A Packet Identifier (PID) detector 913 filters a PID from the bit-deinterleaved signal. If the PID from header information of the TS packet corresponds to a value indicating a packet carrying a Multi Protocol Encapsulation (MPE) section or a Multi Protocol Encapsulation—Forward Error Correction (MPE-FEC) section, the PID detector 913 regards the MPE section or the MPE-FEC section as being received. If the PID from the header information of the TS packet corresponds to a value indicating Program Specific Information/Service Information (PSI/SI), the PID detector 913 regards the psi/SI as being received from the TS packet.

A section detector 915 performs Cyclic Redundancy Check (CRC) checking each time a table ID is detected for MPE packets transmitted in the form of a filtered Internet Protocol (IP) datagram from the PID detector 913 and transmits sections having 'good' CRC results to an MPE-FEC decoder 921, where a table ID is provided for each section, and a table ID for an application data table is '0x3' and a table ID for Reed-Solomon (R-S) data table is 0x78. The section detector 915 also provides information about whether a CRC result is good or not to a section header extractor 917.

The section header extractor 917 performs CRC checking on sections received from the section detector 915 and receives service information associated with broadcasting reception as information indicating whether time slicing and MPE-FEC are applied from headers of sections having 'good' CRC results. In particular, in the present invention, the section header extractor 917 extracts delta-t information 700 transmitted through an MPE section and an MPE-FEC section, and transmits the delta-t information 700 to a time slicing processor 919.

The time slicing processor 919 controls the receiver 900 through a switching operation of receiving a TS packet including only an MPE-FEC frame or a TS packet including only an MPE frame during every burst duration. The burst duration can be checked through the delta-t information 700 that is included in a header of an MPE section and a header of an MPE-FEC section and indicates the start time of a next burst duration. The delta-t information 700 can be acquired by the section header extractor 917.

The MPE-FEC decoder 921 performs R-S decoding on each row of the received MPE-FEC frame. If error correction is successful, the MPE-FEC decoder 921 outputs an IP datagram reconstructed by the R-S decoding to an upper layer. The MPE-FEC decoder 921 then separates an IP datagram of the MPE section of the MPE-FEC frame and parity data of the MPE-FEC section of the MPE-FEC frame from the received TS packet, separately stores the IP datagram in an application data table region of an internal buffer and the parity data in an R-S data table region of the internal buffer, and performs R-S decoding, thereby reconstructing the original broadcasting data.

Figure 1:
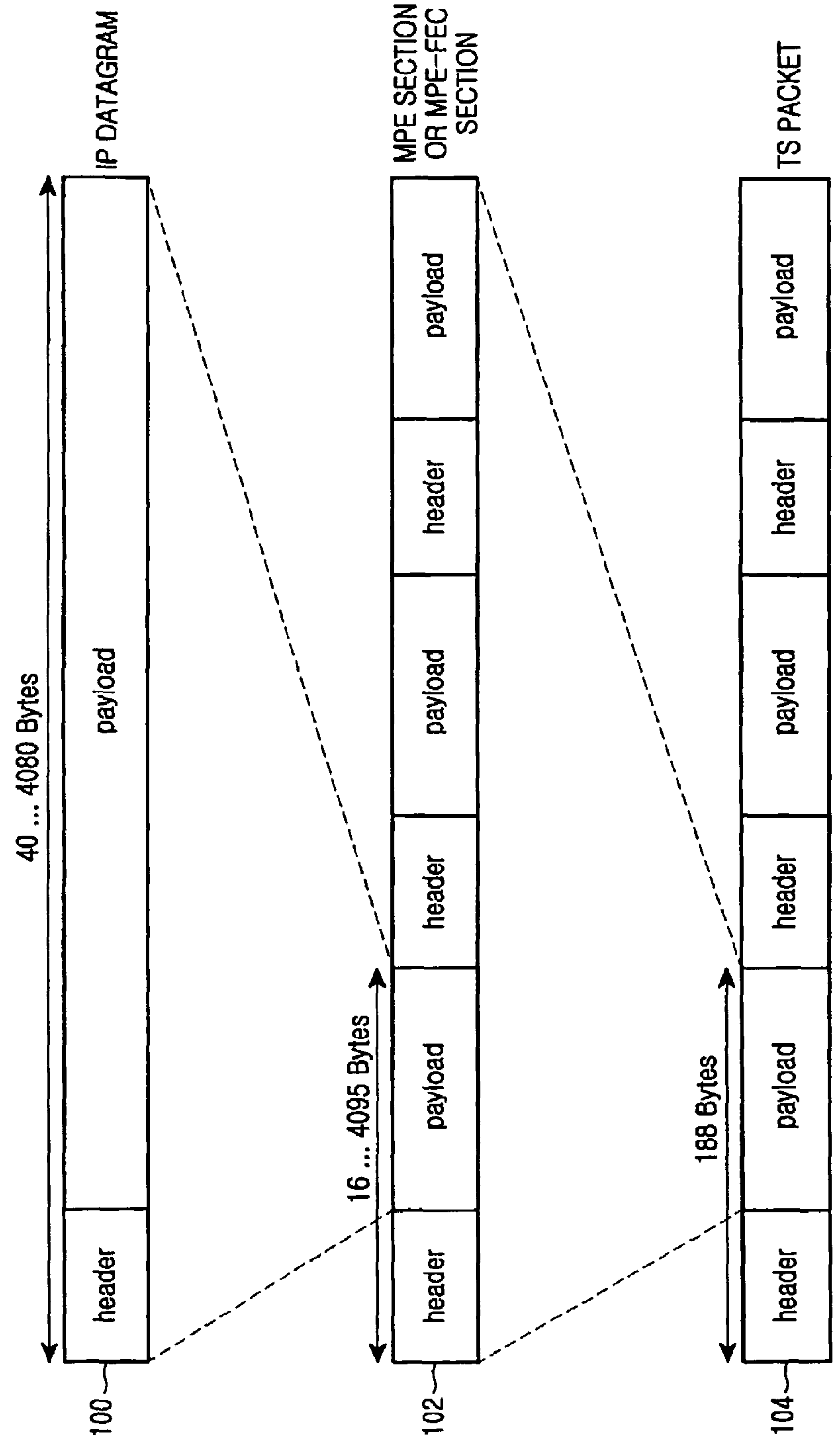
FIG.1 (PRIOR ART)
FIG. 1 illustrates the data structure of a Transport Stream (TS) packet in a general Digital Video Broadcasting-Handhelds (DVB-H) system.
Figure 2:
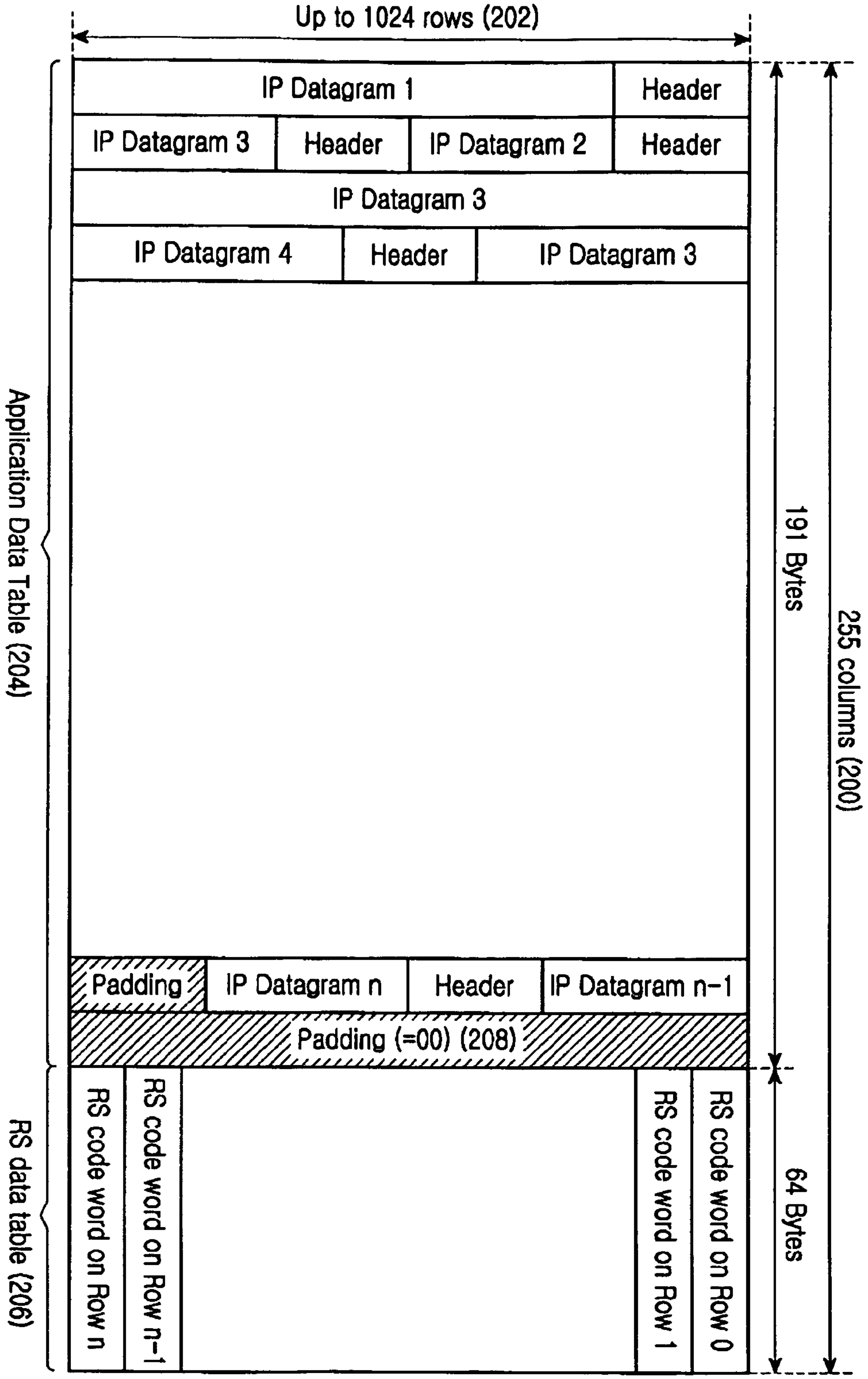
FIG.2 (PRIOR ART)
FIG. 2 explains Reed-Solomon (R-S) encoding performed by a transmitter of a general DVB-H system.
Figure 3:
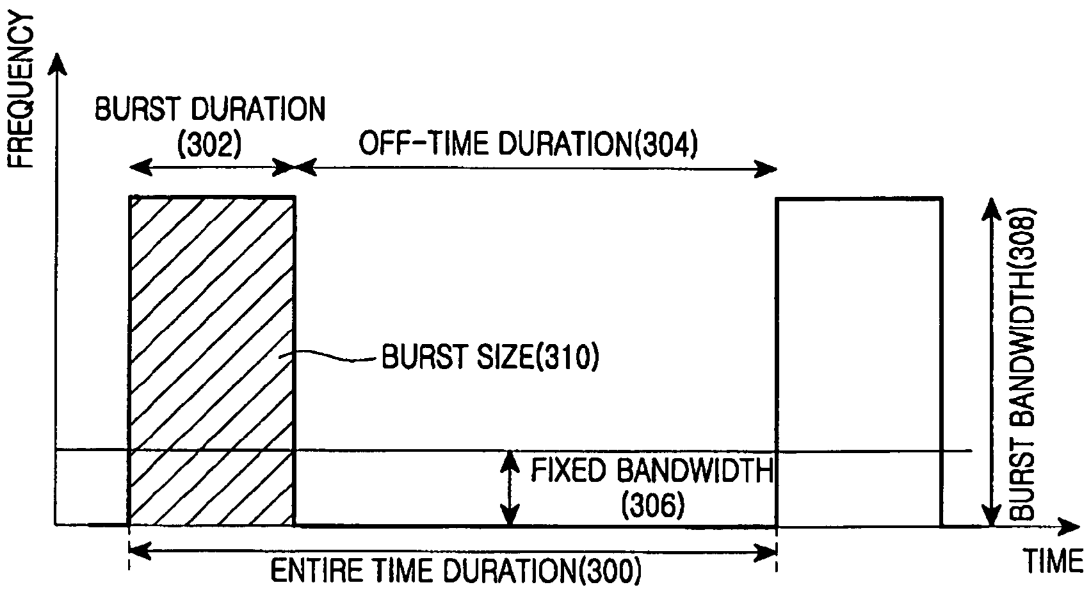
FIG.3 (PRIOR ART)
FIG. 3 explains time slicing for transmission of a TS packet in a transmitter of a general DVB-H system.
Figure 4:
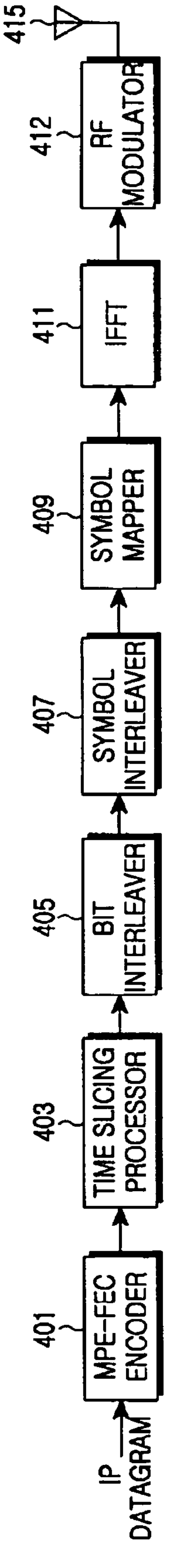
FIG.4 (PRIOR ART)
FIG. 4 is a block diagram of a transmitter in a general DVB-H system.
Figure 8:
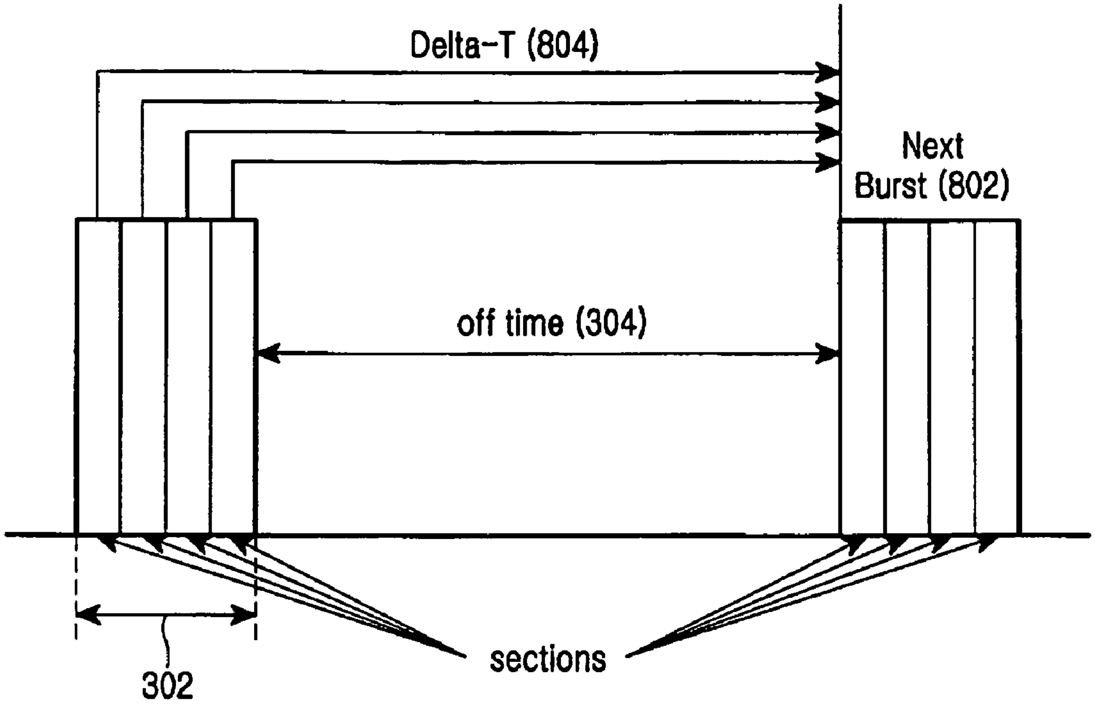
FIG.8 (PRIOR ART)
FIG. 8 illustrates the physical meaning of delta-t information included in a real time parameter.

As discussed above, in the present invention, each time receiving the MPE or MPE-FEC sections 102 (see FIG. 1) during the burst duration 302 (see FIG. 3), a receiver of a DVB-H system predicts the start time of the next burst duration 802 (see FIG. 8) based on delta-t information included in the MPE or MPE-FEC sections 102, stops data reception during the off-time duration 304 (see FIG. 3) after reception of the last section, and checks if a counter counts a value indicated by the delta-t information. As described above, the receiver in the DVB-H system has a counter that counts time indicated by the delta-t information 700 (see FIG. 7) in order to predict the start time of the next burst duration. In other words, the receiver acquires delta-t information from a header of each section constituting an MPE-FEC frame, counts a value indicated by the delta-t information, and resumes data reception by reference to a point of time at which the counter completes counting the value indicated by the delta-t information as the start time of the next burst duration.

Figure 10:
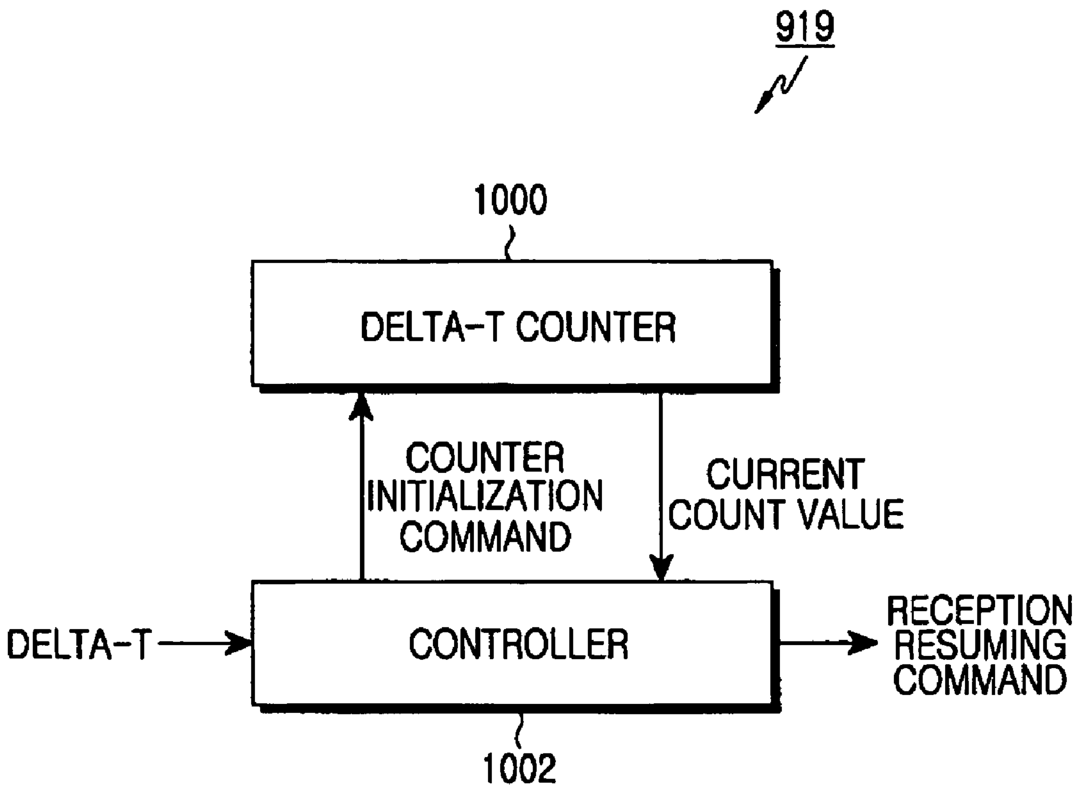
FIG. 10 is a detailed block diagram of a time slicing processor according to the present invention.

Hereinafter, the detailed structure of the time slicing processor 919 for controlling time slicing based on the delta-t information 700 (see FIG. 7) is described with reference to FIG. 10. FIG. 10 is a block diagram of the time slicing processor 919 according to the present invention.

The time slicing processor 919 includes a delta-t counter 1000 and a controller 1002 for controlling an operation of the delta-t counter 1000. Upon reception of the delta-t information 700 from the section header extractor 917 for each MPE or MPE-FEC section, the controller 1002 initializes the delta-t counter 1000 such that the delta-t counter 1000 newly starts a counting operation and counts time elapsed until next delta-t information reception. In other words, each time a section is received, the controller 1002 updates the delta-t counter 1000 with a new value for a counting-down operation. More specifically, if sections are received at intervals of 10 ms and delta-t information included in the. first received section indicates 100 ms, the controller 1002 controls the delta-t counter 1000 to count down from 100 ms. The start time of the next burst duration may be a point of time when the delta-t counter 1000 completes counting 100 ms, i.e., counting down to zero from 100 ms.

If the current reception state is good, the next section would be received after 10 ms, delta-t information included in the second received section would indicate 90 ms, and the delta-t counter 1000 would have counted 10 ms. Therefore, it can be seen that the delta-t information included in the second received section is valid information.

In the present invention, the delta-t counter 1000 updates delta-t information to be counted by the delta-t counter 1000 only until the number of delta-t information reaches a delta-t lock number. A difference between the current count value of the delta-t counter 1000 that have counted down from delta-t information included in the previously received section, and delta-t information included in the currently received section is calculated. If the difference does not exceed a predetermined maximum difference limit, it is determined that the current delta-t information is reliable and a prediction is made that a next burst duration will start when the delta-t counter 1000 completes counting down from the reliable delta-t information. On the other hand, if the difference exceeds the predetermined maximum difference limit, the controller 1002 neglects the current delta-t information and receives a new section without updating the delta-t counter 1000 with the current delta-t information.

For example, it is assumed that delta-t information included in the first received section indicates 100 ms and a predetermined maximum difference limit is 10 ms. Upon reception of the first section, the controller 1002 may control the delta-t counter 1000 to count down from 100 ms. If delta-t information included in the second received section, i.e., second received delta-t information, indicates 70 ms, the controller 1002 controls the delta-t counter 1000 to continue counting down from 100 ms indicated by the first received delta-t information until reception of the third section without updating the delta-t counter 1000 with the second received delta-t information (=70 ms) because a difference between the current count value (=90 ms) of the delta-t counter 1000 that have counted down from 100 ms and the second received delta-t information (=70 ms) exceeds the predetermined maximum difference limit of 10 ms.

The controller 1002 does not repeat the above-described operation every input of new delta-t information. Instead, upon reception of delta-t information from the section header extractor 917 up to the predetermined delta-t lock number, the controller 1002 neglects delta-t information received after the last delta-t information corresponding to the delta-t lock number without initializing the delta-t counter 1000 anymore. For example, when the predetermined delta-t lock number is '3', the controller 1002 does not use delta-t information received after third received delta-t information.

When the delta-t counter 1000 completes counting down from a value corresponding to delta-t information that is determined to be reliable, the controller 1002 determines that the delta-t counter 1000 expires and generates a command for resuming data reception to the receiver 900 at that point of time.

Figure 11:
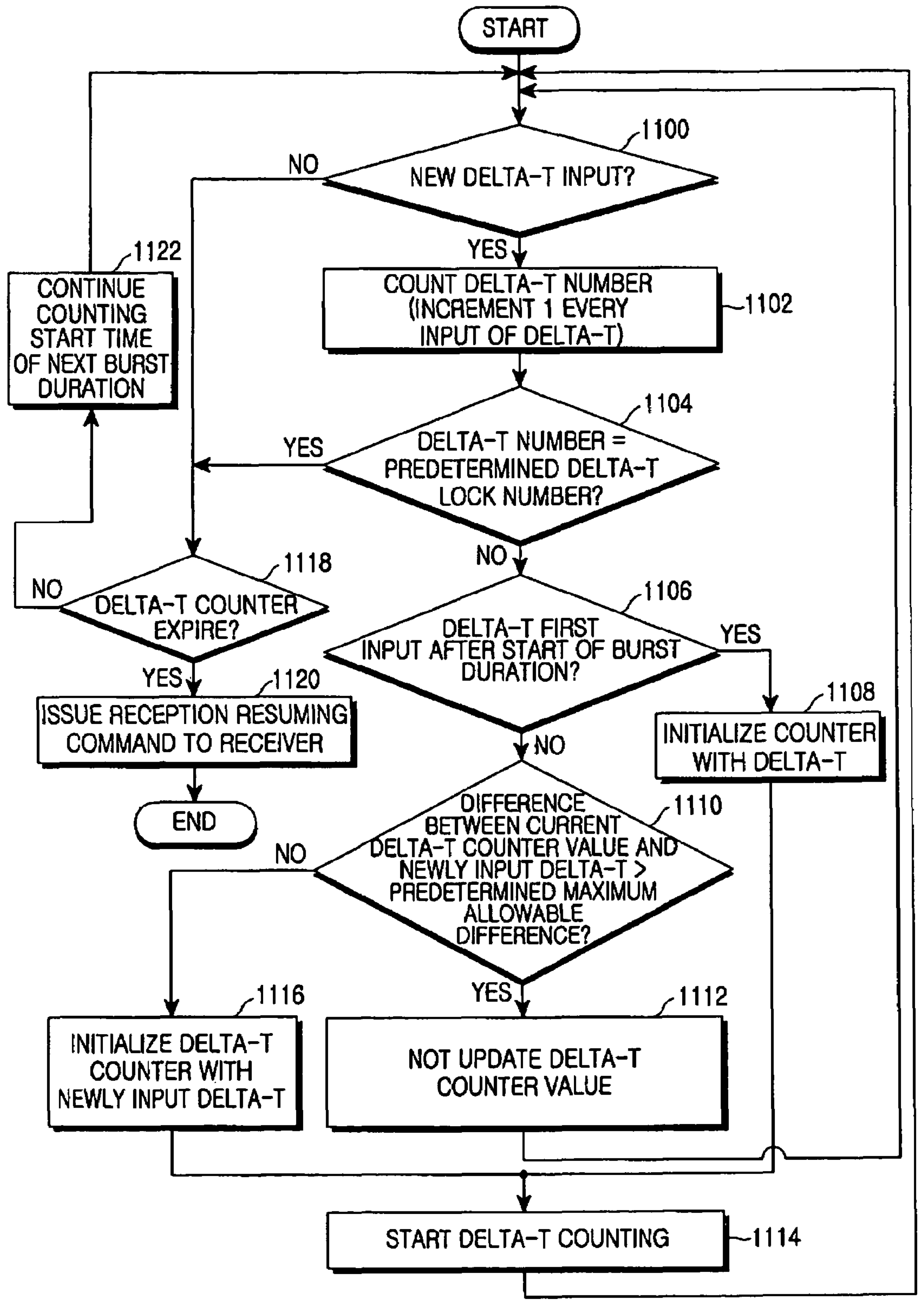
FIG. 11 is a flowchart illustrating an operation of a time slicing processor according to the present invention.

FIG. 11 is a flowchart illustrating an operation of the time slicing processor 919 according to the present invention. First, the controller 1002 checks if new delta-t information is input from the section header extractor 917 in step 1100. If so, the controller 1002 goes to step 1102 to count the number of delta-t information. In other words, for first input delta-t information, the controller 1002 counts "1" as the number of delta-t information. In step 1104, the controller 1002 checks if the number of delta-t information is equal to a predetermined delta-t lock number. Since delta-t information is updated every section reception, the delta-t lock number is used in order to count from already received delta-t information if sections whose number is greater than a predetermined value are received. By doing so, a delta-t information error that may occur later may not be reflected. To facilitate a full understanding of the present invention, it is assumed that the delta-t lock number is "3" and a delta-t value may be set by a user or by a manufacturer based on the result of experiment such as a field test.

If the counted number of delta-t information is not equal to the predetermined delta-t lock number "3", the controller 1002 goes to step 1106 to check if the input delta-t information is delta-t information that is input first after the start of the bust duration.

If so, the controller 1002 goes to step 1108 to initialize the delta-t counter 1000 with the delta-t information input in step 1106 and goes to step 1114 to control the delta-t counter 1000 to initiate a counting operation.

On the other hand, if the counted number of delta-t information is equal to the predetermined delta-t lock number, the controller 1002 goes to step 1118 to check if the delta-t counter 1000 expires. The expiration of the delta-t counter 1000 means that the controller 1002 initializes the delta-t counter 1000 with the input delta-t information and then the delta-t counter 1000 completes counting down from a value corresponding to the input delta-t information. For example, if the input delta-t information indicates 100 ms, the controller 1002 controls the delta-t counter 1000 to count down from 100 ms to 0 ms. If the delta-t counter 1000 expires, e.g., completes counting down to 0 ms, in step 1118, the controller 1002 goes to step 1120 to issue a command for resuming data reception to the receiver 900.

In contrast, if the delta-t counter 1000 does not expire in step 1118, the controller 1002 goes to step 1122 to control the delta-t counter 1000 to continue counting until the start of a next burst duration. More specifically, each time a section is received, the controller 1002 controls the delta-t counter 1000 to count down from delta-t information of the received section. For example, it is assumed that a delta-t lock number is three, sections are received every 10 ms, and a predetermined maximum difference limit is 10 ms. If delta-t information included in the first received section indicates 100 ms, the controller 1002 controls the delta-t counter 1000 to count down from 100 ms. If delta-t information included in the second received section indicates 90 ms, the controller 1002 controls the delta-t counter 1000 to count down from 90 ms because a difference between the current value (=90 ms) of the delta-t counter 1000 and the delta-t information (=90 ms) of the second received section does not exceed the predetermined maximum difference limit. When delta-t information included in the third received section indicates 80 ms, the controller 1002 controls the delta-t counter 1000 to count down from 80 ms because a difference between the current value (=80 ms) of the delta-t counter 1000 and the delta-t information (=80 ms) of the third received section does not exceed the predetermined maximum difference limit. The number of sections received after the third received section exceeds the delta-lock number and thus the controller 1002 neglects delta-t information included in those sections.

If the delta-t information input in step 1100 is not the delta-t information that is input first after the start of the burst duration in step 1106, the controller 1002 goes to step 1110 to check if a difference between the current value of the delta-t counter 1000 and newly input delta-t information exceeds a predetermined maximum difference limit. This is because when a difference between the count value of the delta-t counter 100, which has been counted from previously received delta-t information, and currently received delta-t information exceeds the maximum difference limit, one of the previously received delta-t information and the currently received delta-t information may have an error. In this case, it is not possible to recognize which one of the previously received delta-t information and the currently received delta-t information is reliable, thus the delta-t counter 1000 counts from an average of the previously received delta-t information and the currently received delta-t information.

Thus, if the difference exceeds the maximum difference limit in step 1110, the controller 1002 goes to step 1112 in order not to update the delta-t counter 1002 and goes to step 1100 to control the delta-t counter 1002 to count down until reception of delta-t information included in a new section.

If the difference does not exceed the predetermined maximum difference limit, the controller 1002 goes to step 1116 to initialize the delta-t counter 1000 with the newly input delta-t information and goes to step 1114 to control the delta-t counter 1000 to initiate a counting operation.

For example, it is assumed that delta-t information included in the first received section, i.e., the first received delta-t information indicates 100 ms, delta-t information included in the second received section, i.e., the second received delta-t information indicates 90 ms, delta-t information included in the third received section, i.e., the third received delta-t information indicates 60 ms, and the predetermined maximum difference limit is 10 ms. When delta-t information are input at three intervals of 10 ms, the delta-t counter 1000 starts counting down from 100 ms. Upon reception of the second section, a difference between the input delta-t information of the second section, i.e., 90 ms, and the current count value of the delta-t counter 1000, i.e., 90 ms, is 0 ms, which does not exceed the predetermined maximum difference limit(=10 ms). Therefore, the delta-t counter 1000 resumes counting down from 90 ms indicated by the input delta-t information of the second section. Upon reception of the third section, a difference between the input delta-t information of the third section, i.e., 60 ms, and the current count value of the delta-t counter 1000, i.e., 80 ms, is 20 ms, which exceeds the predetermined maximum difference limit(=10 ms). Therefore, the controller 1002 receives delta-t information included in a new section without updating the delta-t counter 1000 with the delta-t information included in the third section.

Delta-t information processing by the controller 1002 according to the present invention will be described with reference to FIG. 11. First, when failing to receive the first delta-t information, the controller 1002 waits for reception of delta-t information by issuing a delta-t reception command to the receiver 900. Upon reception of delta-t information, the controller 1002 controls the delta-t counter 1000 with the received delta-t information. When delta-t information is no longer received, the controller 1002 controls the delta-t counter 1000 to count down from a value indicated by the first received delta-t information and generates a reception resuming command for next burst reception.

Upon reception of new delta-t information after the reception of the first delta-t information, the controller 1002 checks a difference between the current count value of the delta-t counter 1000 from the first delta-t information and the new delta-t information, e.g., second received delta-t information exceeds a maximum difference limit corresponding to a delta-t jitter, which can be adjusted by software or hardware. If the difference does not exceed the maximum difference limit, the controller 1002 determines the second received delta-t information to be valid and controls the delta-t counter 1000 to count down from the second received delta-t information.

However, if the difference exceeds the maximum difference limit, one of the first received delta-t information and the second received delta-t information has an error, and it cannot be determined which one of them is reliable. Therefore, the controller 1002 controls the delta-t counter 1000 not to count down from the second received delta-t information and controls the delta-t counter 1000 to predict the start time of a next burst duration from the first received delta-t information until reception of new delta-t information. The number of received delta-t information is counted in order to neglect delta-t information received after the last delta-t information corresponding to a delta-t lock number that has been preset by software and to control the delta-t counter 1000 to count down from the latest delta-t information. By doing so, a delta-t information error that may occur due to a poor reception environment is not reflected into time slicing of the receiver 900.

As described above, according to the present invention, the receiver of the DVB-H system can accurately predict the start time of a next burst duration using delta-t information of high reliability and control the receiver to accurately receive a TS packet during the next burst duration. In this way, the receiver can prevent malfunction and receive a desired burst.

While the invention has been shown and described with reference to preferred embodiments thereof, it will be understood by those skilled in the art that various changes in form and details may be made therein without departing from the spirit and scope of the invention.

What is claimed is:

1. A method for receiving broadcasting data in a receiver of a digital broadcasting system supporting time slicing, the method comprising:

- detecting in a section header extractor section headers carrying broadcasting service information from a received Transport Stream (TS) packet and extracting delta-t information from the section headers;
- counting in a time slicing processor the number of extracted delta-t information;
- comparing in the time slicing processor the counted number of delta-t information with a predetermined delta-t lock number;
- when the counted number is less than the predetermined delta-t lock number, counting in the time slicing processor a start time of a next burst duration based on the delta-t information;
- when the counted number is less than the predetermined delta-t lock number, checking in the time slicing processor if the delta-t information is delta-t information that is first input after the start of the burst duration;
- when the delta-t information is a first input delta-t information, counting in the time slicing processor the time indicated by the delta-t information;
- when the delta-t information is not the first input delta-t information, checking in the time slicing processor validity of the delta-t information; and
- counting in the time slicing processor a time indicated by valid delta-t information after checking the validity.

2. The method of claim 1, further comprising resuming data reception when completing counting the start time indicated by the delta-t information.

3. The method of claim 1, wherein the checking of the validity comprises checking if a difference between a current delta-t counter value and newly input delta-t information exceeds a predetermined maximum difference limit.

4. The method of claim 3, further comprising:

- when the difference exceeds the predetermined maximum difference limit, continuing counting down from the delta-t counter value until reception of new delta-t information without updating the delta-t counter value wit the newly input delta-t information.

5. The method of claim 3, further comprising:

- when the difference does not exceed the predetermined maximum difference limit, counting the start time of a next burst duration based on the newly input delta-t information.

6. An apparatus for receiving broadcasting data in a receiver of a digital broadcasting system supporting time slicing, the apparatus comprising:

- a section header extractor for detecting section headers carrying broadcasting service information from a received Transport Stream (TS) packet and extracting delta-t information from the section headers; and
- a time slicing processor for counting a number of extracted delta-t information, comparing the counted number of delta-t information with a predetermined delta-t lock number, counting a start time of a next burst duration based on the delta-t information when the counted number is less than the delta-t lock number, and resuming data reception when completing counting time indicated by the delta-t information,
- wherein the time slicing processor checks if the delta-t information is delta-t information that is first input after the start of the burst duration and counts the time indicated by the delta-t information when the delta-t information is first input delta-t information,
- wherein the time slicing processor checks validity of the delta-t information when the delta-t information is not the first input delta-t information and counts a time indicated by the valid delta-t information, and
- wherein the time slicing processor checks the validity of the delta-t information by checking if a difference between the current delta-t counter value and the newly input delta-t information exceeds a predetermined maximum difference limit.

7. The apparatus of claim 6, wherein the time slicing processor does not count the start time of the next burst duration based on the delta-t information when the counted number is greater than the delta-t lock number.

8. The apparatus of claim 6, wherein the time slicing processor does not count the start time of the next burst duration based on the newly input delta-t information when the difference exceeds the predetermined maximum difference limit.

9. The apparatus of claim 6, wherein the time slicing processor counts the start time of the next burst duration based on the newly input delta-t information when the difference does not exceed the predetermined maximum difference limit.

10. A method for receiving broadcasting data in a receiver of a digital broadcasting system supporting time slicing, the method comprising:

detecting in a section header extractor section headers carrying broadcasting service information from a received Transport Stream (TS) packet and extracting delta-t information from the section headers;

counting in a time slicing processor a start time of a next burst duration based on the delta-t information;

when a difference between first delta-t information included in a newly received section and a current delta-t counter value counting the start time of the next burst duration using second delta-t information included in a previously received section does not exceed a predetermined maximum difference limit, updating the current delta-t counter value counting the start time of the next burst duration using newly received first delta-t information and counting the start time of the next burst duration using the updated delta-t counter value; and receiving a next burst at the start time of the next burst duration.

11. The method of claim 10, further comprising:

when the difference exceeds the predetermined maximum difference limit, counting the start time of the next burst duration using previously received delta-t information without updating the current delta-t counter value using the newly received first delta-t information; and receiving the next burst at the start time of the next burst duration.

* * * * *